C. K. HASTY.
HOG HOLDER.
APPLICATION FILED JAN. 12, 1920.

1,388,258.

Patented Aug. 23, 1921.
3 SHEETS—SHEET 1.

Inventor.
C. K. Hasty.
by
Lacey & Lacey
Attys

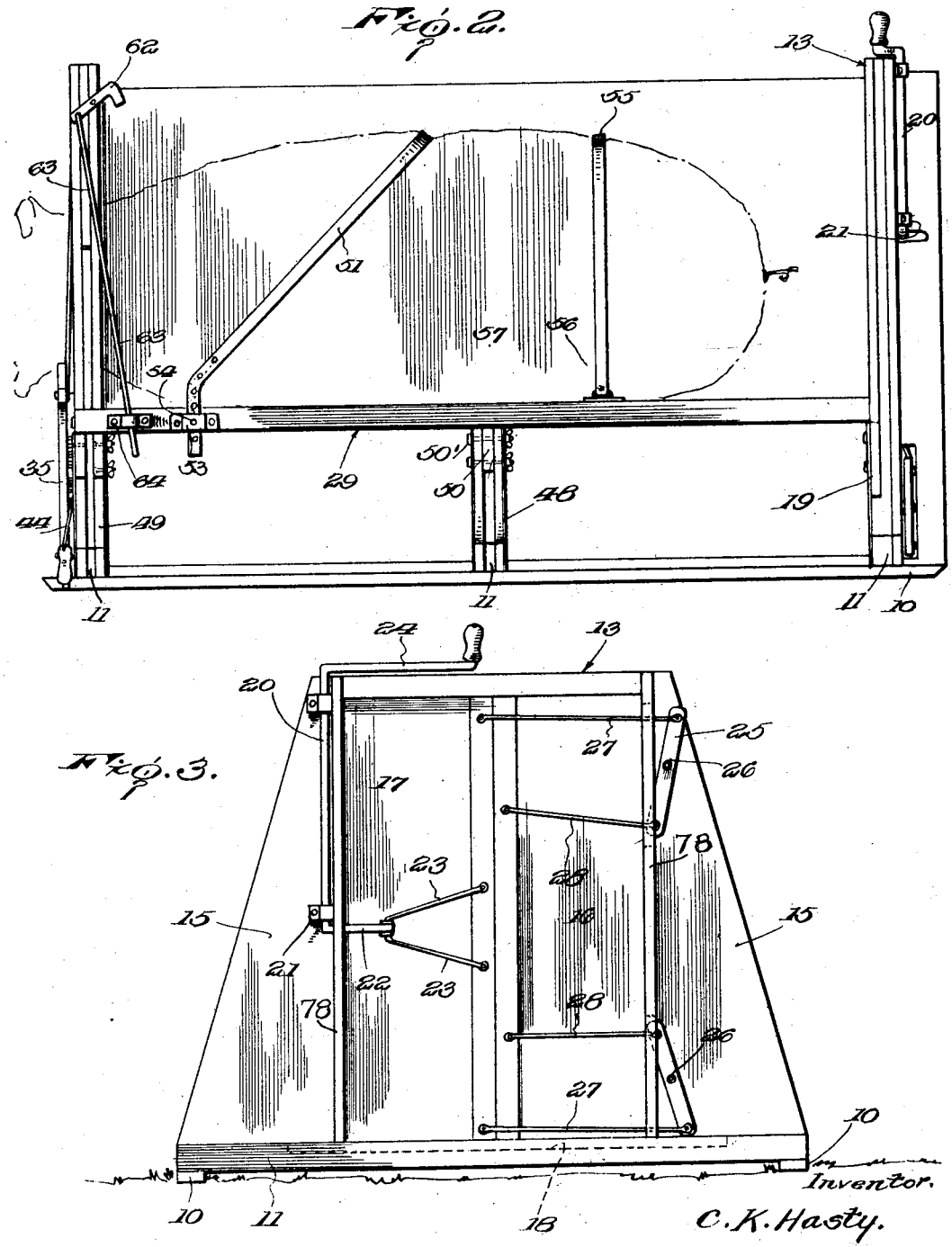

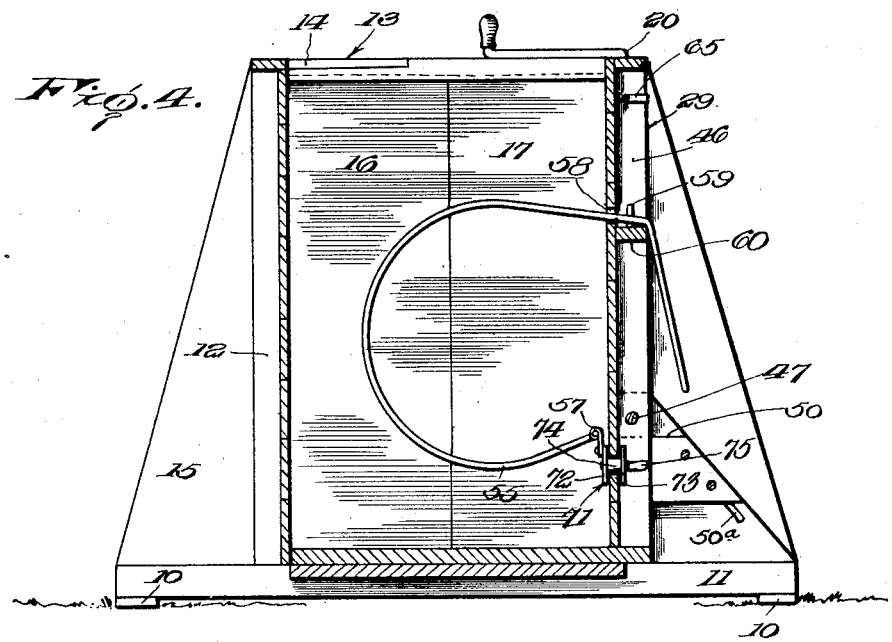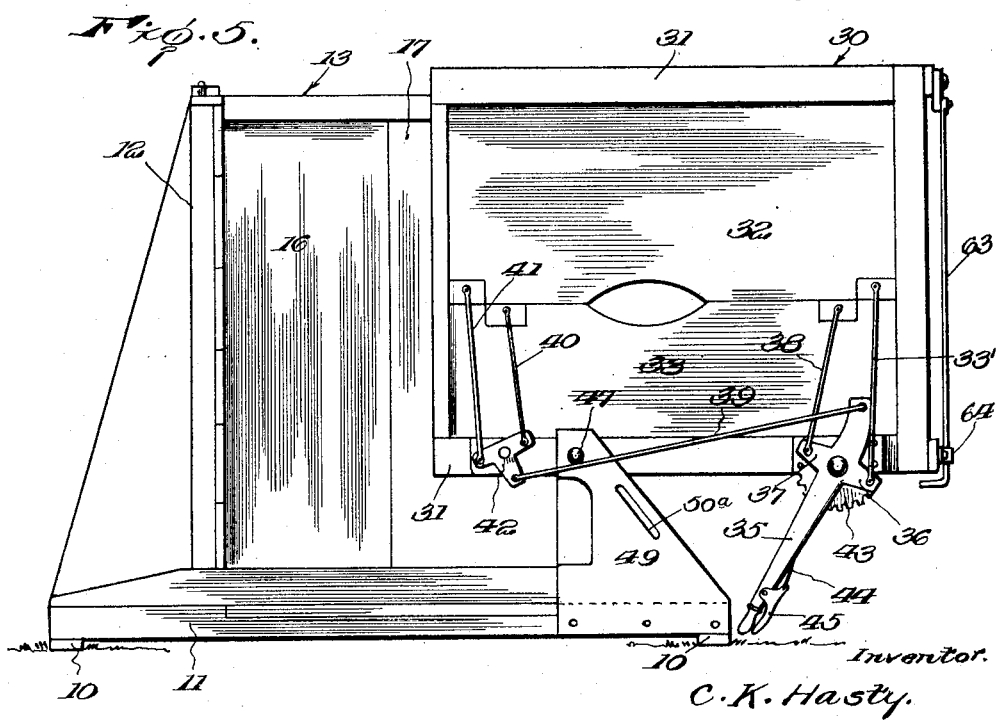

UNITED STATES PATENT OFFICE.

CECIL K. HASTY, OF WHAT CHEER, IOWA.

HOG-HOLDER.

1,388,258.   Specification of Letters Patent.   Patented Aug. 23, 1921.

Application filed January 12, 1920. Serial No. 350,840.

*To all whom it may concern:*

Be it known that I, CECIL K. HASTY, a citizen of the United States, residing at What Cheer, in the county of Keokuk and State of Iowa, have invented certain new and useful Improvements in Hog-Holders, of which the following is a specification.

This invention relates to improvements in restraining devices for animals and more particularly to a device for holding such animals as hogs and sheep while being operated upon.

An important object of this invention is to provide a restraining device for hogs having novel means whereby the head of a hog may be readily gripped for ringing the hog's nose or marking its ears, without the possibility of injuring the hog as the result of holding it.

A further object of this invention is to provide a restraining device for hogs and other animals having novel means whereby the hog may be readily and conveniently turned over on its side and held in that position while being operated upon.

A further object of the invention is to provide an apparatus of the character described which will securely and safely hold the hog or other animal so that when the same is turned over on its side there will be no possibility of injury to the animal.

A further object of this invention is to provide a restraining device for hogs and other animals which requires a minimum of attendant labor and which when in use will leave the hands and feet of the operator entirely free.

A further object of the invention is to provide an animal restraining device which is efficient in use, of highly simplified construction and comparatively cheap to manufacture.

In the accompanying drawings forming a part of this application and in which like numerals are employed to designate like parts throughout the same:

Fig. 2 is a side elevation of the same in an operative position,

Fig. 3 is an end elevation of the same,

Fig. 4 is a vertical transverse section through the apparatus.

Fig. 5 is an end elevation of the apparatus in an operative position.

Figure 1:
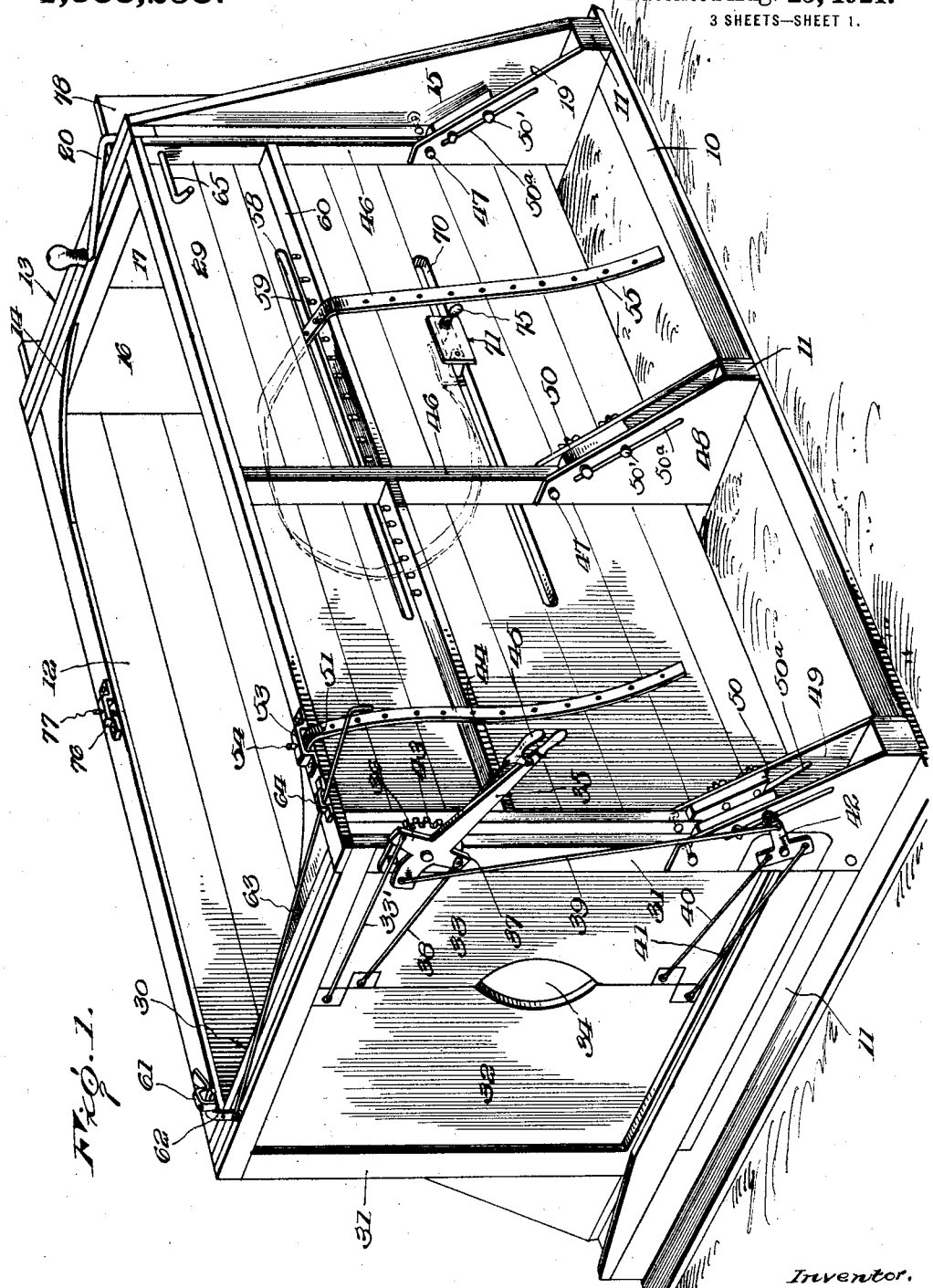
Figure 1 is a perspective of an apparatus embodying the invention.

In the drawings wherein for the purpose of illustration is shown a preferred embodiment of the invention, the numeral 10 designates a pair of spaced parallel runners which are connected by a plurality of cross beams 11. The ends of the runners 10 may be beveled so as to permit the apparatus to be dragged over the ground to the point of use. When in the desired position, the runners 10 provide a stable base for the apparatus so that the same will not wobble. The base thus provided has one vertical side 12 and a vertical end wall 13 each of which is permanently secured to the base. The side and end walls 12 and 13 respectively are connected by a brace 14.

As illustrated in Fig. 3 the end wall 13 is in the form of a frame mounted upon one of the cross pieces 11 and provided with upstanding braces or supports 15 on opposite sides. A pair of doors 16 and 17 are slidably carried by the end wall 13 and are adapted to be moved outwardly to permit the hog or other animal to enter what may be termed the runway of the apparatus. The lower portions of the doors 16 and 17 are slidably mounted in a groove 18 in the adjacent cross piece 11 and are adapted to pass between the upstanding braces 15 and a pair of standards 19 carried by the runners 10. The doors are controlled by a vertically arranged crank 20 which is secured to one of the braces 15 by bearing brackets 21 and which is provided with an arm 22 having connection with the inner vertical edge portion of the door 17 through links 23. Obviously when the crank 20 is rotated by its handle 24, the door 17 will be moved outwardly between the adjacent braces 15 and standards 19. A pair of levers 25 are pivoted intermediate their ends as indicated at 26, to the other brace and are provided at one of their ends with links 27 which have pivotal connection with the door 17, so that when said door 17 is moved outwardly the levers 25 will be rocked for opening the door 16 through the medium of a pair of links 28. By this construction the doors 16 and 17 are opened simultaneously for providing an entrance opening for the hog or other animal. Obviously by a reverse or anti-clockwise movement of the crank the doors may be returned to the closed position.

The side 29 of the apparatus has rigid connection with the end 30 which is arranged opposite the end 13 and is in the form of a frame having spaced sides 31. As particularly illustrated in Figs. 1 and 5, the end 30 is provided with doors 32 and 33 which are slidable between the uprights 31 so that the doors may be moved outwardly for positioning the head of a hog forwardly of the doors with its neck arranged within the opening 34 formed by providing opposed recesses in the meeting edges of the doors. The position of the doors is controlled by a hand operated lever 35 which is pivoted to one of the uprights 31 at a point spaced from its forward end. The lever is provided with a laterally extending arm 36 which is connected to the door 32 through the medium of a rigid link 33' so that a rocking movement of the lever will cause the door to move outwardly. The lever is provided with a second laterally extending arm 37 which is arranged opposite the arm 36 and is connected to the adjacent door by a rigid link 38, whereby the doors are operated in unison. The lower portions of the doors are also moved outwardly by a rod 39 which is pivotally connected to the forward end of the lever 35 and has connection with links 40 and 41 through the medium of a pivoted T 42. When the lever 35 is rocked on its pivot, the doors are moved outwardly simultaneously and are prevented from jamming by reason of the fact that the operating device is connected to both the upper and lower portions of the doors. A segment 43 is secured to one of the uprights 31 and is provided with a plurality of teeth which are engaged by the dog of a pawl 44 having a handle 45 pivoted to the rear portion of the lever 35. The dog carried by the link or rod 44 enables the doors 32 and 33 to be securely held in an adjusted position so that the hog or other animal will be prevented from sliding the doors open and thus escaping.

When it is desired to mark the ears of a hog or ring its nose, the hog is driven into the runway so that its neck may be positioned within the opening 34. After the doors have been moved inwardly so as to firmly grip the neck of the hog without injury to it, the desired operation may be performed. After the ears of the hog have been marked or other operation performed, the doors 32 and 33 may be moved outwardly by an upward movement of the lever 35 so as to permit the hog to leave the runway. It will be noted that while the head of the hog is being treated its body and limbs are confined within the runway, so that the operator may not be annoyed by the kicking of the hog.

With reference to Fig. 1 it will be noted that the side 29 which is rigidly connected to the end wall 30 is provided with a plurality of vertical parallel beams 46 which are pivotally connected, as indicated at 47, to one of the braces 19 and additional braces 48 and 49. It will be noted that the brace 49 is in two sections so as to permit the door 33 to be moved outwardly. Shoulders 50 are supported by the braces 19, 48 and 49 and are engaged by the vertical beams 46 of the pivoted table when the table is arranged in the position illustrated in Fig. 2. The shoulders 50 may be adjusted vertically through the medium of bolts 50' which are extended through elongated slots 50ª in the braces 19, 48 and 49 so that the position of the table may be controlled at will by the proper adjustment of the shoulders.

In this manner the animal to be operated upon may be positioned either horizontally or with its limbs extending slightly upwardly to facilitate the operation. When the section 29 is in a horizontal or inclined position, as illustrated in Fig. 5, the same serves as a table for supporting the hog.

Upon entering the runway, the hog or other animal has its head confined within the opening 34 formed in the doors 32 and 33. The doors 32 and 33 are of course opened to permit of the insertion of the animal's head within the opening 34 and the doors are subsequently closed so as to securely grip the animal's neck. The side section 29 which also serves as an operating table is provided with a longitudinally extending elongated slot 70 which slidably receives a head 71 of a strap 55. As particularly pointed out in Fig. 4, the head 71 of the strap includes inner and outer spaced plates 72 and 73 which are connected by a pair of spaced sleeves 74 extended through the elongated slot 70. By this construction the head 71 may be adjusted longitudinally of the table so that the strap 55 may be arranged about any desired portion of the animal's body. The head 71 is adjusted manually by gripping a laterally projecting handle 75 extended from one of the sleeves 74. The upper or free end portion of the strap 55 is passed through the longitudinal slot 58 in the section 29 and is engaged with any one of a plurality of spaced locking pins 59 carried by a longitudinally extending beam 60. The strap is provided with a plurality of spaced apertures adapted to receive any one of the pins 59 whereby the straps may be tightened to the desired degree about the animal's body. The beam 60 and the locking devices 59 are arranged on the outer side of the operating table so that a comparatively smooth surface is provided upon which the animal may rest.

As illustrated in Fig. 2, a strap 51 which is adapted to be passed about the forward portion of the animal's body is passed through a guide bracket 53 having a pin 54 which extends through the openings in the strap so as to adjustably connect the strap to the bracket.

When the apparatus is being prepared for the entry of the animal into the runway, the strap 55 is laid upon the bottom of the runway and the free end portion of the same is passed through a bracket 76 arranged on the top of the stationary section 12 so as to prevent the animal from becoming entangled in the strap. After the animal has been secured to the table with its head extended beyond the doors 32 and 33, the table is moved to a horizontal or approximately horizontal position so that the desired operation may be performed. If desired the table may be arranged in an inclined position so as to slightly invert the animal while being operated upon. The hog in being thus securely strapped to the table is prevented from kicking to any great extent and annoying the operator. With reference to Fig. 5 it will be noted that the door 33 is narrower than the door 32 so that when the hog is laid over on its side its neck will not be strained or twisted.

The side 29 and the end wall 30 may be detachably locked to the stationary side 12 by a pair of coacting latches 61 and 62, the latter being provided with an operating rod or link 63. The rear end portion of the rod 63 is passed through a guide 64 carried by the section 29 whereby the rear end portion of the rod and the lever 35 are arranged in proximity on the same side of the apparatus.

The side section 29 is connected at one end to the stationary end wall 13 by a longitudinally movable spring actuated latch 65 which may be readily released when it is desired to move the table on its pivot.

As particularly illustrated in Figs. 1 and 3, the entrance end of the apparatus is provided with a pair of vertically arranged wings 78 between which the animal must pass in order to enter the runway.

In the operation of the apparatus the doors 16 and 17 are opened to permit the hog to enter the runway preparatory to being strapped to the table 29 in case the operation to be performed on the hog is of such a nature as to necessitate its assuming a horizontal or inclined position. On the other hand, if the hog or other animal is merely to have ear marks applied, or to have its nose provided with a ring, the head is merely locked between the doors so that the operator will not be annoyed by the movement of the remaining portions of the hog's body. After the hog has been operated upon the lever 35 is rocked on its pivot for opening the doors 32 and 33 which permits the hog to leave the runway.

It is to be understood that the form of the invention herewith shown and described is to be taken as a preferred embodiment of the same and that such minor changes in arrangement and construction of parts may be made as will remain within the spirit of the invention and the scope of what is claimed.

Having thus described the invention, what is claimed is:

1. A restraining device for animals including a support, a table horizontally pivoted to said support and provided with a longitudinally extending opening, a fastening element adapted to be passed about the body of a hog, a head at the lower end of said fastening member slidably mounted in said opening and comprising spaced plates engaging opposite sides of the table at said opening, and means for maintaining the plates in fixed spaced relation, and a plurality of spaced fastening members carried by said table and adapted to be selectively engaged by the free end portion of said fastening element.

2. A restraining device including a horizontally pivoted table having a longitudinally extending opening, a fastening element for securing the animal's body to the table, said table being provided with a longitudinally extending slot arranged in spaced relation to said elongated opening, a strap provided at its lower end with a head slidably arranged in said elongated opening and provided at its other end portion with a plurality of spaced openings, and a longitudinal beam on the table immediately below said slot and provided with spaced locking pins adapted to be received within one of said openings whereby said strap may be adjusted longitudinally of the table.

3. A restraining device for animals including a base, a frame arranged upon the base and provided with doors, a lever pivoted to said frame and having arms, links connecting said arms and said doors, a T-shaped member secured to said frame, a second set of links connected to said T-shaped member and said doors, and a rod connected to said lever and said T-shaped member whereby a movement of said lever will operate said doors simultaneously.

4. A device of the class described including a frame, a pair of doors carried by the frame, a lever pivoted to said frame and provided with arms, links connecting said arms and said doors, means to secure said lever in an adjusted position, a T-shaped member pivoted to said frame, a rod connecting said T-shaped member to said lever, and a second set of links connecting said T-shaped member to said doors.

5. A restraining device for animals including a base, pairs of spaced braces arranged along one longitudinal edge portion of the base, a table having beams horizontally pivoted to the upper ends of said pairs of braces, and shoulders adjustably carried between said pairs of braces and adapted to be engaged by said table when the same is swung to an operative position.

6. A restraining device for animals including a base, braces secured along one longitudinal edge portion of the base, a table having beams horizontally pivoted intermediate their ends to said braces, said braces being provided with slots, shoulders having fastening means adjustably extending through said slots, the beams of said table being adapted to engage said shoulders, and means for securing the animal to said table.

In testimony whereof I affix my signature.

CECIL K. HASTY. [L. S.]